United States Patent [19]

Heppke et al.

[11] Patent Number: 4,767,194
[45] Date of Patent: Aug. 30, 1988

[54] BLUE PHASE LIQUID CRYSTAL SYSTEM, METHOD OF OPERATION AND ITS USE

[75] Inventors: Gerd Heppke; Feodor Oestreicher; Heinz-Siegfried Kitzerow; Michael Krumrey, all of Berlin, Fed. Rep. of Germany

[73] Assignee: Merck Patent Gesellschaft mit Beschränkter Haftung, Darmstadt, Fed. Rep. of Germany

[21] Appl. No.: 59,345

[22] Filed: Jun. 8, 1987

Related U.S. Application Data

[63] Continuation of Ser. No. 753,837, Jul. 11, 1985, abandoned.

[30] Foreign Application Priority Data

Jul. 11, 1984 [DE] Fed. Rep. of Germany ....... 3425584

[51] Int. Cl.$^4$ ............................................. G02F 1/137
[52] U.S. Cl. ................................. 350/346; 350/331 T; 350/347 V; 350/348
[58] Field of Search ............... 350/351, 352, 348, 349, 350/346

[56] References Cited

U.S. PATENT DOCUMENTS

| | | | |
|---|---|---|---|
| 3,781,088 | 12/1973 | Tsukamoto et al. | 350/346 |
| 3,833,287 | 9/1974 | Taylor et al. | 350/349 |
| 3,836,243 | 9/1974 | Melchior | 350/351 X |
| 4,009,934 | 3/1977 | Goodwin et al. | 350/346 |
| 4,386,836 | 6/1983 | Aoki et al. | 350/346 |
| 4,389,096 | 6/1983 | Hori et al. | 350/348 |
| 4,452,511 | 6/1984 | Huffman | 350/346 |

FOREIGN PATENT DOCUMENTS 8402198 6/1984 PCT Int'l Appl. ................. 350/352

OTHER PUBLICATIONS

V. A. Belyakov and V. E. Dmitrienko, "The Blue Phase of Liquid Crystals," Sov. Phys. Usp. 28(7), Jul. 1985, pp. 535–562.

*Primary Examiner*—Stanley D. Miller
*Assistant Examiner*—David Lewis
*Attorney, Agent, or Firm*—Millen & White

[57] ABSTRACT

An optical system contains a liquid crystal cell (1), to the liquid crystal layer (11) of which an E-field can be applied transversely to the plane of the layer. A light source (3) sends to the liquid crystal cell (1) a beam of rays parallel to the field direction. The liquid crystal is in the form of a chiral, optically isotropic phase ("blue phase"). This phase has a field-dependent optical density for the incident light and is matched to the light wavelength such that no selective reflection takes place. Such a cell is also optically isotropic in the presence of an E-field, switches rapidly and requires no interface orientation. Its preferred fields of use are: intensity modulation of light of a given wavelength, or as a phase grid in a schlieren-optical system, an etalon in a laser, or a light switch.

20 Claims, 1 Drawing Sheet

BLUE PHASE LIQUID CRYSTAL SYSTEM, METHOD OF OPERATION AND ITS USE

This is a continuation of application Ser. No. 753,837 filed July 11, 1985, now abandoned.

BACKGROUND OF THE INVENTION

This invention relates to an optical system based on a liquid crystal phase.

Related arrangements are known from IEEE Trans. Electron Devices ED-26 (1979) 1734 which disclosure is incorporated by reference herein. Therein is described a schlieren-optical system made as follows. Light of a relatively narrow frequency band is aligned parallel through a first lens system, then sent through a phase grid and subsequently projected onto a screen via a projection lens. The phase grid here is realized by a liquid crystal cell. Specifically, this cell contains two glass plates, the inner surface of each of which carries a fine pattern of strip electrodes parallel to one another and an orientating layer, the plates enclosing a liquid crystal layer between them. The liquid crystal has a positive dielectric anisotropy and, at rest, has a privileged direction parallel to the extension of the electrodes.

If an electrical voltage is applied to the electrodes of this cell, those liquid crystal molecules which sense an E-field are tilted in the direction of the field. This produces the result that light which oscillates parallel to the extension of the electrodes finds in the liquid crystal layer a refractive index modulated with the grid period and is correspondingly diffracted. The diffraction angle of a maximum of a particular order is given by the geometry of the arrangement and the wavelength of the light, while its intensity can be controlled by the voltage applied.

The type of cell described allows switching times of less than 15 msec, but with the precondition of an extremely thin liquid crystal layer of about 2 μm, which imposes extremely high requirements on the production of the cell. If a change is made to larger distances between the plates, both the switch-on and the switch-off time increase disproportionately (compare FIG. 4 in the reference). Moreover, even values of the order of magnitude of 10 msec are still too high when large amounts of information—for example video signals—are to be processed. There is also another disadvantage: light oscillating at right angles to the extension of the electrodes senses (virtually) nothing of the change in refractive index induced by the field; it therefore does not take part in the diffraction and does not contribute to the effect. Last but not least, the condition that the liquid crystal layer must be preorientated is also unsatisfactory; the cited publication envisages vapor-deposition processes in vacuo for this. These cause considerable trouble in production of the cells.

SUMMARY OF THE INVENTION

It is thus an object of this invention to modify the optical system of the abovementioned type so that the liquid crystal cell has more favorable switching characteristics, uses most of the incident light and moreover can be more conveniently produced.

Upon further study of the specification and appended claims, further objects and advantages of this invention will become apparent to those skilled in the art.

According to this invention, these objects have been achieved by providing the arrangement of an optical system containing (1) a liquid crystal cell (1) with (a) two polarizer-free carrier plates (5, 6), which are each provided, on their surfaces facing one another, with an electrically conductive covering (electrodes 8,9), and (b) a liquid crystal layer (11) enclosed between the carrier plates; (2)- a voltage source (3) connected to the electrodes (8, 9), which produces in the liquid crystal layer (11) an electrical field which is at least directed approximately perpendicular to the plane of the layer; (3) a light source (2) placed in front of the liquid crystal cell (1), which sends a beam of rays onto the liquid crystal cell (1), and in particular (a) in a direction which essentially corresponds to the direction of the field, and (b) at a frequency at which the liquid crystal layer (11) is essentially transparent and has a field-dependent optical density; characterized in that (1c) the liquid crystal layer (11) is present in a chiral, optically isotropic phase (i.e., with or without the E-field).

In preferred options, the system of this invention is characterized in that the local dielectric anisotropy of the liquid crystal layer (11) has a positive value greater than 3, in particular greater than 7, in the field-free state; or the local dielectric anisotropy of the liquid crystal layer (11) has a negative value less than −1 in the field-free state; or the local dielectric anisotropy of the liquid crystal layer (11) has different signs above and below a certain alternating voltage frequency; or the liquid crystal layer (11) is a mixture of at least one nematic component and one chiral component; or the liquid crystal layer (11) is between 20 μm and 250 μm thick, in particular between 25 μm and 100 μm thick; or an alternating voltage of between 30 Hz and $10^5$ Hz, in particular between 500 Hz and $10^4$ Hz, is applied to the electrodes (8, 9).

BRIEF DESCRIPTION OF THE DRAWINGS

Various other objects, features and attendant advantages of the present invention will become more fully appreciated as the same becomes better understood when considered in conjunction with the accompanying drawings, in which like reference characters designate the same or similar parts throughout the several views, and wherein.

DETAILED DISCUSSION

Figure 1:
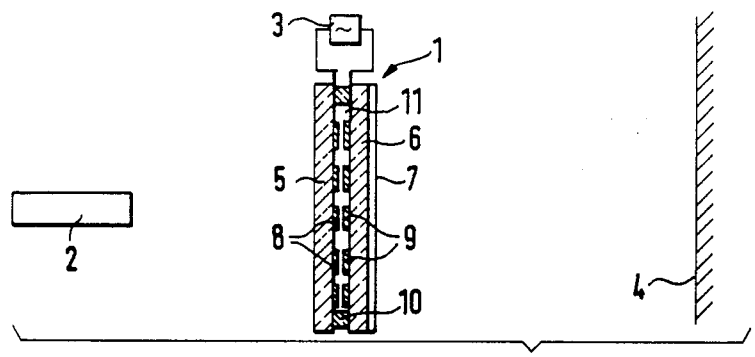
FIG. 1 shows a greatly simplified representation of a system according to the invention, with a liquid crystal cell in cross-section.

In this connection, the terms "polarizer-free carrier plate" and "essentially transparent liquid crystal layer" have the following meaning: a carrier plate is "polarizer-free" if it carries no polarizer and also does not itself polarize; no polarizing element is then to be found either in front of or behind the liquid crystal layer in the region of the cell. The liquid crystal layer is "essentially transparent" if, during operation of the system, it does not filter out any components of the light passing through—for example by selective reflection or absorption.

The liquid crystal phase envisaged according to the invention ("blue phase") arises if certain chiral systems are warmed from the cholesteric phase or cooled from the isotropic phase, and is stable below the clear point in a narrow temperature range. At least two distinguishable, three-dimensionally ordered blue phase modifications exist, one of which (BP I) prevails at lower temperatures and the other of which (BP II) prevails at higher temperatures. Both BP types are (virtually) non-birefringent and exhibit the selective reflection customary of the cholesteric phase, that is to say they behave in an optically isotropic manner and reflect circularly polarized light in a narrow frequency range with the handedness of the cholesteric phase on which they are based. The reflection maxima are at different wavelengths, which are in general shifted towards red in comparison with the $\lambda_{max}$ value of the starting cholesteric phase. A detailed description of the blue phase can be found in the monograph published by W. Helfrich and G. Heppke "Liquid Crystals of one and two-dimensional order", Springer Verlag, 1980, pages 161–175.

The blue phase has recently been investigated relatively intensively, and in particular, above all, because it still has not been possible to develop a structural model which satisfactorily explains all the effects observed. In these investigations, the behavior of the blue phase under the influence of a field has already been studied. Thus, Mol. Cryst. Liq. Cryst. 99 (1983) 99, reports that as the field strength increases, the selective reflection bands of both BP types are shifted towards longer wavelengths and BP II is transformed into BP I. It is also known from investigations with polarization mircoscopes that the BP I and BP II types become birefringent in the field or, respectively, remain isotropic; from this, it has been concluded the the E-field causes an optically biaxial and, respectively monoaxial anisotropy in these modifications (Z. Naturforsch. 39a (1984) 475).

The phenomenon that the BP I phase—if the nature of the interface is suitable—will also keep its optical isotropy under the action of the field and that both phase types moreover display a field-dependent optical density has, however, as far as can be seen, not yet been observed or discussed. This effect forms a basis of the present invention. It is characterized by the following properties:

The switch-on and switch-off times are at most about 1 msec, and values as low as a few μsec can be achieved. This favorable value is all the more remarkable since the blue phase is considerably more viscous than the associated cholesteric phase and, for example, the color-shift effect which is already known has a reaction time of about 0.1 second.

The switching behavior is independent of the plate separation. A relatively large latitude is thereby obtained for designing the system.

The light efficiency is high, because the optical density of the liquid crystal layer—with or without the field—is the same for all components of the light entering.

Preorientation of the liquid crystal is not necessary. It must even be avoided if the optical anisotropy is to be retained.

The effect found here is greater, the more pronounced the local dielectric anisotropy ($\Delta\epsilon_l$) of the blue phase. ($\Delta\epsilon_l$) can be determined, for example, from the difference between the two values of the liquid crystal in its blue phase state and in its twisted nematic phase. A further increase is to be expected if the phase has a dielectric anisotropy of different sign above and below a certain alternating voltage frequency. It has been found, in fact, that the refractive index decreases as the field increases if the liquid crystal cell has a $\Delta\epsilon_l$ greater than 0, and increases if $\Delta\epsilon_l$ is less than 0.

The liquid crystal cell should be controlled using a frequency in the audio range. At frequencies below 30 Hz, hydrodynamic turbulences could occur, and at frequencies greater than $10^5$ Hz, the liquid crystal can no longer be kept more or less temperature-stable. If a sinusoidal voltage of relatively low frequency (e.g., less than $10^3$ Hz) is applied, the refractive index is capable of tracking the change in voltage and is accordingly modulated with respect to time. If the degree of modulation is to remain low at frequencies less than $10^3$ Hz, it is advisable to use a square wave voltage which has a relatively high content of harmonic waves of higher frequency.

The liquid crystal cell of this invention can be used, for example, in the following functions:

as a light valve for intensity modulation of radiation of a particular wavelength.

as a diffraction grid in a schlieren-optical system, in particular to show motion pictures;

as a a tuner, e.g., a Fabry-Perot interferometer for the wavelength of light, in particular light produced in a laser;

as a lens of variable focal length and as a light switch, e.g., operated with a field-controlled total reflection angle.

For each of these application systems, the employment of the optical system of this invention can be accomplished by making only routine modifications to the otherwise conventional configurations as will be apparent to skilled workers. Details of the conventional configurations are disclosed in many references, see e.g. Mol. Cryst. Liq. Cryst. Lett. 64 (1980) 69.

The arrangement of FIG. 1 contains a liquid crystal cell 1, voltage source 3, a light source 2 and a projection surface 4.

The cell contains two glass plates 5, 6 and a heating film 7. The inner surfaces of the two substrates are each provided with a thin-layer electrode 8, 9. These electrodes, which align with one another in the direction of the perpendicular to the plate, each form a strip grid with a grid constant of 40 μm. A frame 10 holds the two plates at a distance of 23 μm and is hermetically sealed with the plates 9.

The chamber formed by the plates and the frame is filled with a liquid crystal substance (11). This liquid crystal may comprise e.g., the pyrimidine-containing nematic wide-range mixture "RO TN 404" from Hoffman La Roche or ZLI-1840 of E. Merck, Darmstadt and the chiral, mesogenic 4-cyano-4'-(2-methyl-butyl) biphenyl, which is marketed by BDH under the name "CB 15". A preferred mixture contains the chiral compound in an amount of 62.3% by weight and overall has a $\Delta\epsilon_l$ greater than 5. On heating up, the phase transitions in this mixture are effected at the following temperatures: cholesteric/BP I at 26° C., BP I/BP II at 27° C. and BP II/isotropic at 28° C. On cooling, the BP I/cholesteric transition, in particular, can be supercooled. The pitch has a value between 50 nm and 700 nm, in particular between 200 nm and 300 nm.

These details are only by way of an example. Any liquid crystal which produces a phase having the properties described above can be utilized in this invention. A wide variety of nematic substances and mixtures can be utilized. These are well known to skilled workers. Similarly, a wide variety of chiral substances are also well known. See e.g., D. Demus, Flüssige Kristalle in Tabellen, VEB Deutscher Verlag für Grundstoffindustrie, Leipzig 1974 and D. Demus, Flüssige Kristalle in Tabellen II, Leipzig 1984. Determination of conditions under which a blue phase will be achieved is also routine. In general, employment of liquid crystal mixtures having a blue phase is greatly preferred for this invention.

The voltage source delivers a 1 kHz sinusoidal voltage of adjustable amplitude, e.g., coventionally in the range of 10–100 V.

Suitable light sources are commercially available, e.g., HeNe lasers. For the preferred embodiment above, a HeNe beam with a wavelength of 632 nm and an intensity in the mW range is directed perpendicularly onto the cell. The laser wavelength is to be above the region over which the selective reflection maxima of the liquid crystal layer are spread at the applied voltage. Intensities are also not critical.

When the liquid crystal is in the starting state, only the primary beam is observed, as in the disordered isotropic phase. In the presence of a field, intensity maxima manifest themselves on the projection screen at certain distances from the optical axis, the relative intensities of adjacent maxima changing with the field.

Figure 2:
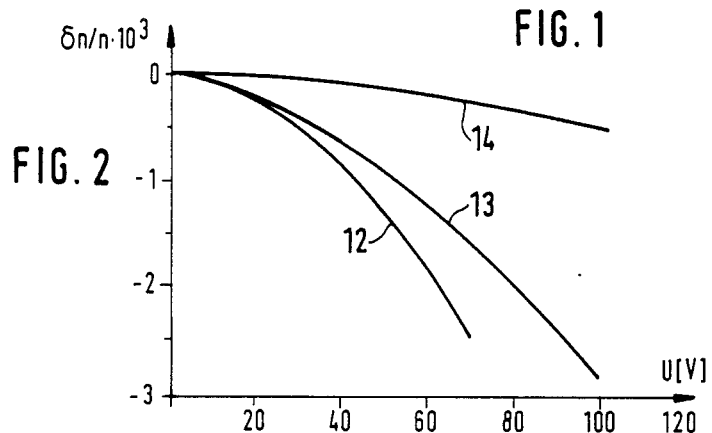
FIG. 2 shows the relative change in refractive index as a function of the voltage applied.

In this arrangement, the relative change in the refractive index n in the field direction can be determined. This parameter, $\delta n/n$, is plotted in FIG. 2 s a function of the voltage U applied, and in particular for the modification BP I and BP II and for disordered isotropic phase (curves 12, 13 and 14). It can be seen that the refractive index clearly decreases with the increasing E-field in both BP modifications, and decreases relatively slightly above the clear point.

Figure 3:
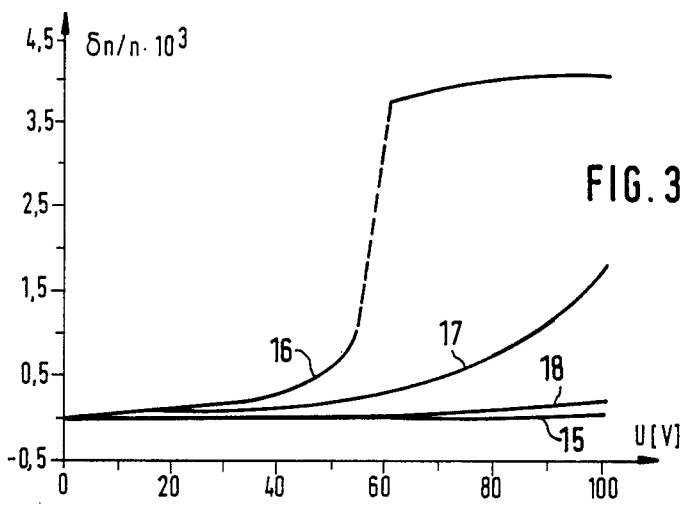
FIG. 3 shows the same function using a different liquid crystal substance.

FIG. 3 shows the function $\delta n/n$ of a liquid crystal substance with a negative dielectric anisotropy. This subtance contains, as the nematic carrier, the wide-range mixture "EN 18" (Lixon), which is doped with 26.5% by weight of the chiral compound "S 811" (Merck). The results which have been obtained from measurements at temperatures of 38.6° C., 44.0° C., 44.5° C. and 48.4° C. are shown (curves 15, 16, 17 and 18). At 38.6° C., the liquid crystal is cholesteric; at 44.5° C. and 48.4° C., the BP II modification and, respectively, the disordered isotropic phase are present. At 44.0° C., the liquid crystal is transformed from BP I to the cholesteric phase when a voltage of about 5V is exceeded; this phase transformation manifests itself in a marked discontinuity in curve 16. The second liquid crystal substance moreover confirms that the refractive index in the blue phase changes with a sign opposite to the sign of the dielectric anisotropy.

The invention is not restricted only to the embodiment examples shown. It is thus not critical in what liquid crystal system the blue phase is produced. It could therefore also be realized, for example, in a liquid crystal polymer, in a lyotropic system, with microemulsions or microsuspensions or in microencapsulated liquid crystals. In addition, the operating light in no way has to be monochromic; frequency mixtures are also entirely possible, if the intended use allows these and no unacceptable selective reflections occur.

Where necessary, conventional means can be used to heat and/or cool the cell as necessary to maintain the cell temperature at the desired value corresponding to a given blue phase. Unless indicated to the contrary herein, all details of the devices of this invention are fully conventional and can be selected in accordance with the usual considerations relating to liquid crystal devices.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An optical system for modifying light transmitted therethrough comprising:
   (1) a liquid crystal cell comprising (a) two polarizer-free carrier plates facing one another, each having on its surface facing the other, a patterned electrode, and (b) a liquid crystal layer enclosed between the carrier plates;
   (2) an AC voltage source operationally connected to the electrodes and which in operation produces in the liquid crystal layer an electrical field which is directed essentially perpendicularly to the plane of the layer;
   (3) a light source placed in front of the liquid crystal cell which in operation impinges a beam of light onto the liquid crystal cell in a direction which essentially corresponds to the direction of the electric field, said light consisting essentially of a frequency or frequencies to which the liquid crystal layer is essentially transparent and has a field-dependent optical density; and
   (4) an optical element utilizing the light transmitted through the liquid crystal layer,
   wherein the liquid crystal layer is in a blue phase during operation of the system and does not selectively filter out wavelength components of the light passing through.

2. A system of claim 1, wherein the local dielectric anisotropy of the liquid crystal layer has a positive value greater than 3 in the field-free state.

3. A system of claim 1, wherein the local dielectric anisotropy of the liquid crystal layer has a positive value greater than 7 in the field-free state.

4. A system of claim 1, wherein the local dielectric anisotropy of the liquid crystal layer has a negative value less than $-1$ in the field-free state.

5. A system of claim 1 wherein the local dielectric anisotropy of the liquid crystal layer has different signs above and below a certain alternating voltage frequency.

6. A system of claim 1 wherein the liquid crystal layer is a mixture of at least one nematic component and one chiral component.

7. A system of claim 1 wherein the liquid crystal layer has a thickness of 20 $\mu$m to 250 $\mu$m.

8. A system of claim 1 wherein the liquid crystal layer has a thickness of 25 $\mu$m to 100 $\mu$m.

9. A system of claim 1 wherein the frequency of the alternating voltage is 30 Hz to $10^5$ Hz.

10. A system of claim 1 wherein the frequency of the alternating voltage is 500 Hz to $10^4$ Hz.

11. A system of claim 9 wherein the alternating voltage is a square wave voltage.

12. In an optical system for intensity modulation of light of a certain wavelength comprising a liquid crystal cell, a voltage source and a light source, the improvement wherein the optical system is that of claim 1.

13. In a schlieren-optical system, comprising a liquid crystal cell, a voltage source and a light source, the improvement wherein the optical system is that of claim 12.

14. In a display system for showing motion pictures, the improvement wherein the display system comprises a schlieren-optical system of claim 13.

15. In an optical system effective as a lens comprising a liquid crystal cell, a voltage source and a light source, the improvement wherein the optical system is that of claim 12.

16. An optical system of claim 15 wherein the light source is a laser.

17. In an optical system effective as a lens of variable focal length, comprising a liquid crystal cell, a voltage source and a light source, the improvement wherein the optical system is that of claim 12.

18. In an optical system effective as a light switch, comprising a liquid crystal cell, a voltage source and a light source, the improvement wherein the optical system is that of claim 12.

19. An optical system of claim 1 wherein the liquid crystal phase is a blue phase.

20. A method of influencing light comprising directing the light onto the liquid crystal cell of claim 1.

* * * * *